July 8, 1952 — K. MÜLLER — 2,602,236
GEAR WHEEL TESTING APPARATUS
Filed April 8, 1947 — 2 SHEETS—SHEET 1
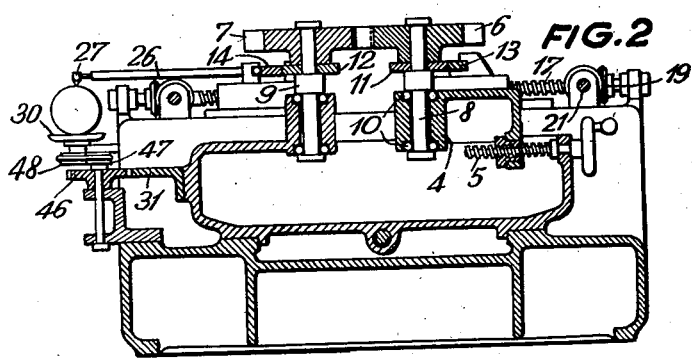
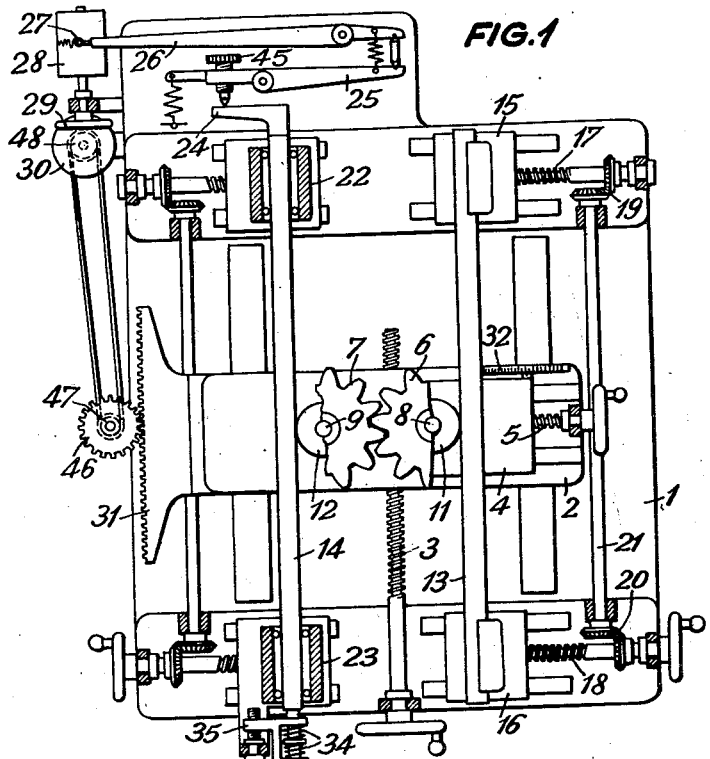
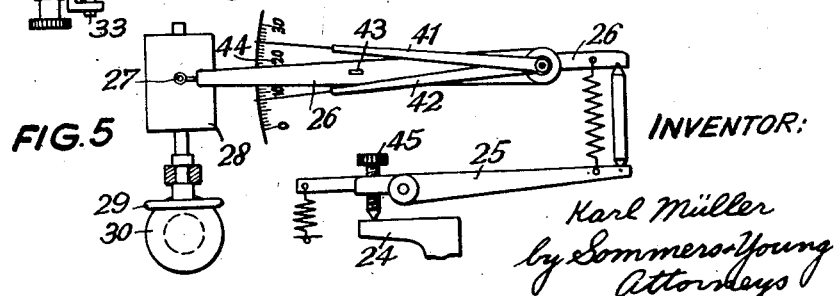
INVENTOR:
Karl Müller
by Sommers & Young
Attorneys July 8, 1952  K. MÜLLER  2,602,236
GEAR WHEEL TESTING APPARATUS
Filed April 8, 1947  2 SHEETS—SHEET 2
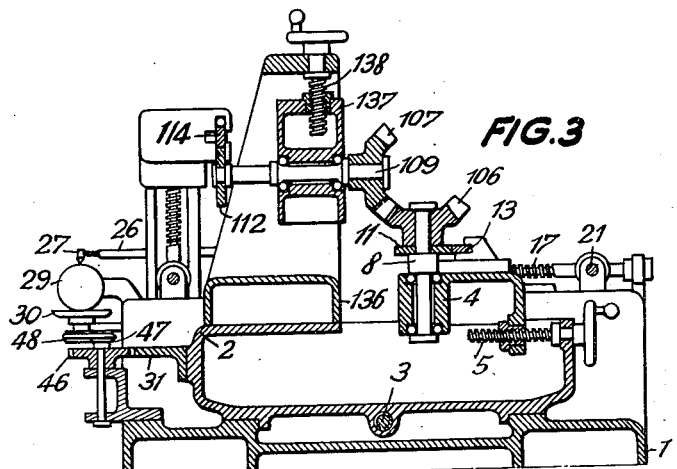
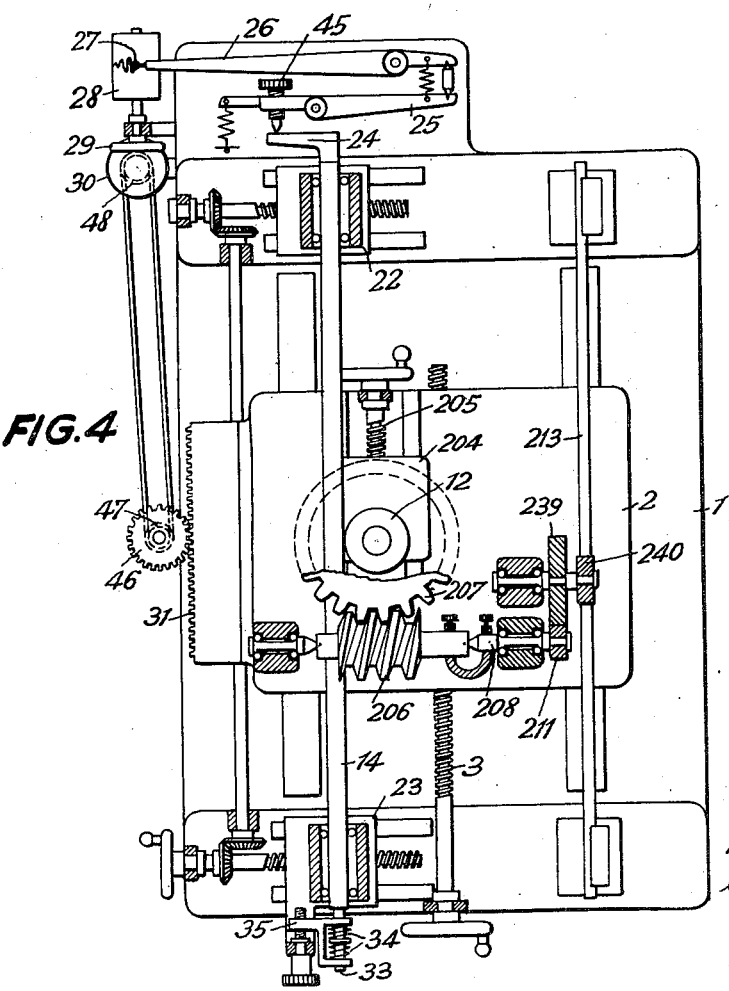
INVENTOR:
Karl Müller
by Sommers-Young
Attorneys Patented July 8, 1952

2,602,236

UNITED STATES PATENT OFFICE 2,602,236

GEAR WHEEL TESTING APPARATUS

Karl Müller, Zurich, Switzerland, assignor to Maag-Zahnräder und Maschinen Aktiengesellschaft, Zurich, Switzerland Application April 8, 1947, Serial No. 740,190
In Switzerland May 14, 1946

7 Claims. (Cl. 33—179.5)

My invention relates to improvements in testing apparatus for gear wheels and worm-gears, operating according to the one-flank meshing method known in the art.

In such latter method, the tooth flanks of a wheel are made to mesh with those of a master wheel, i. e. only those tooth flanks which in actual operation intermesh when the wheel is rotating in a certain sense, whereas the rear flanks are not subjected to the testing procedure.

Cylindrical gauging discs are mounted onto the pins carrying the wheels to be tested, and their diameters are such as to afford the same gear ratio as the said two wheels. The latter may be mounted on a carriage displaceable in direction of two rulers which are parallel to each other, the gauging discs (which do not contact each other) rolling off on the said rulers. One of the latter is stationary, and the other is longitudinally movable. Owing to the toothing errors of the two test pieces their rotary movements, i. e. the speed on the gauging-disc circumference, do not precisely agree with each other, whereby the longitudinally movable ruler is subjected to small displacements corresponding to the size of the error which are registered in larger scale by an indicator. When testing worm gears the measuring disc of the worm may be coupled to the stationary ruler by means of a transmission gear.

Various forms of my invention are shown in the accompanying drawings in which

Fig. 1 shows in plan view, a device for testing spur wheels,

Fig. 2 a section through same,

Fig. 3, in section, a device for testing bevel wheels,

Fig. 4 in plan, a device for testing worm gears, and

Fig. 5 in elevation, a device for testing the enveloping error or maximum error.

A carriage 2, displaceable by means of a spindle 3, is mounted on the bed 1 (Figs. 1, 2). A second carriage 4, movable by a spindle 5, is mounted on carriage 2. The gear-wheel 6, i. e. one of the gear-wheels 6 and 7 to be tested, is mounted readily and truly circularly rotatable in ball-bearings 10 on the carriage 4 by means of a mandrel 8. The other gear wheel 7 is mounted, in a manner identical to wheel 6, directly in the carriage 2 by means of a mandrel 9. A cylindrical measuring or gauging disc 11, 12 is mounted on each mandrel 8, 9; and the diameters of the discs are of the same ratio, relative to each other, as the pitch circles of the two wheels 6, 7. The diameters of discs 11, 12, however, are smaller than those of wheels 6, 7 so that the two discs do not contact each other when the wheels mesh.

Two rulers 13, 14 are disposed parallel to the direction of travel of carriage 2, which tangentially contact the measuring discs 11, 12 and are frictionally engaged to the latter by virtue of a certain contact pressure. Ruler 13 is fastly mounted on two carriages 15, 16 which are displaceable by means of spindles 17, 18 on bed 1 in the direction of travel of carriage 4. Spindles 17, 18 are truly uniformly rotated by the bevel wheels 19, 20 which are interconnected by means of a shaft 21. In this way, ruler 13 is moved parallel to itself toward and away from the mandrel 8, in accordance with the diameter of the measuring disc 11 used, until ruler 13 firmly abuts against disc 11. The ruler 14 also is supported on two carriages 22, 23 and may be readily displaced thereon longitudinally, to which end it is mounted on balls. It is moved relative to mandrel 9 and disc 12 identically as ruler 13 relative to mandrel 8 and disc 11. Ruler 14 at one end is provided with an arm 24 extending at right angles and integral therewith. Arm 24 co-operates with a two-arm lever 25 which in its turn co-acts with a second two-arm lever 26. The latter at one end is provided with a writing pen 27 which records the longitudinal displacements of ruler 14 on a rotating drum 28. The latter is rotated by virtue of carriage 2 moved parallel to rulers 13, 14 by spindle 3. To such end, a rack 31 is secured to carriage 2 at the left side thereof, and engages a gear wheel 46 on which a driving disc 47 is fixedly mounted. The recording drum 28 is engaged by a friction drive 29, 30 which comprises a driven disc 48 which is rotated by disc 47 when displacing carriage 2.

When carrying out the test, first the carriage 4—after mounting the gear wheels 6, 7—is adjusted, by means of a scale 32 provided on the carriage 2, to the normal spacing of the axes of the said wheels. The rulers 13, 14 then are moved toward each other until they firmly contact the two measuring or gauging discs 11, 12. A pressure-applying device, comprising a pin 33, two springs 34 and an adjustable fork 35, is provided at the free end of ruler 14. According to whether fork 35 is moved in one direction or the other, ruler 14 also is slightly moved longitudinally in such direction, until the tooth flanks or gear wheel 7 which is slightly rotated in the corresponding direction, are brought into abutment against the tooth flanks of gear wheel 6. Lever 25, by means of setting screw 45, is brought into contact with arm 24 and so adjusted as to position writing pen 27 above the center of drum 28. When, now turning spindle 3, carriage 2 is moved parallel to the rules, the gauging discs rolling thereon. Ruler 13 being stationary, gear wheel 6 will rotate accurately in proportion to the carriage advance, and gear wheel 7 in the opposite direction. Due to the errors of toothing of the two wheels, the rotation of the driven wheel, i. e. the peripheral speed of the gauging disc, will not always agree with that of the driving wheel, but will oscillate about a mean value. Ruler 14, therefore, does not remain stationary, but alternately will be slightly displaced in correspondence with the summed-up errors of the toothings. The said errors are recorded magnified by the writing device on the paper of drum 28 which is moved proportionally to the rotation of the wheel. In order to bring the rear tooth flanks to mesh for testing, fork 35 simply is displaced in the opposite direction, and the writing pen re-adjusted by means of screw 45. The sense of rotation of wheels 6, 7 during such test has no bearing whatever upon the result of measurement.

Fig. 3 shows a device for testing bevel wheels, which differs from the device shown for spur wheels in that the mandrel 109, of the second bevel wheel 107 is mounted not vertically, but horizontally on carriage 2. For this purpose, a standard 136 is mounted on the carriage 2, and a carriage 137 is mounted vertically displaceably thereon by means of a spindle 138. A mandrel 109 is mounted on carriage 137, and to one end thereof the bevel wheel 107 to be tested and to the other end the gauging disc 112 is secured. The bevel wheels to be tested are brought into proper mesh by means of the two spindles 5 and 138. The two rulers 13, 114 to be coupled to the two gauging discs 11, 112 again are mounted at their ends on displaceable carriages (the one associated with ruler 114 being vertically displaceable), and one of the rulers at one end is provided with an integral plain arm 24 (Fig. 1) acting on the writing and recording device. Said ruler is also provided with the pressure-applying device 33—35 (Fig. 1) adapted to bring one or the other tooth flank into mesh. Again, the curve of errors is recorded by displacing the carriage 2 parallel to the rulers.

The device shown in Fig. 4 is adapted for testing worm gears. In such case and in contra-distinction to the testing of spur wheels and bevel wheels, there always is a great difference in the number of revolutions of the two test wheels. A cylindrical disc 211, connected to a transmission gear comprising the discs 239 and 240, is secured to the axle 208 of worm 206. Disc 240 is frictionally engaged by the stationary ruler 213 so that, upon displacing carriage 2 parallel to the rulers, the worm is rotated relatively quickly. The worm wheel 207 is mounted on a carriage 204, and its mandrel is provided with a gauging disc 12 which is coupled to a movable ruler 14 as in Figs. 1 and 2. Ruler 14 is connected to a recording device and also to a pressure-applying device, in a manner identical to that in the device for testing spur wheels. Worm wheel 207 and worm 206 are adjusted to the proper interaxial spacing by means of the carriage 204 which is movable on carriage 2 by means of spindle 205 parallel to the rulers. Worm 206 is rotated upon displacing carriage 2 and the transmission ratio of discs 12, 211, 239 and 240 is so selected that ruler 14 is at standstill except being subjected to the variation due to the toothing errors which are recorded as before.

When it is desired to measure only the accumulated error, originating from pitch errors and eccentricity, without recording the curve of errors (in particular when a master wheel free of errors is available as counterwheel) this may be done by means of the arrangement shown in Fig. 5.

In Fig. 5, two loose hands 41, 42 are mounted coaxial with the fulcrum or pivot of lever 26, and are displaced by a catch 43 of the latter. Prior to starting the measurement hands 41, 42 are made to coincide so that they both point to the same division of a scale 44 and contact catch 43. During a revolution of the wheel to be tested, catch 43, separates the two loose hands in correspondence to the maximum and minimum value of the accumulated error, in which position they remain. Their spacing, as measured on the scale 44, indicates the amount of the total accumulated error.

What I claim and desire to secure by Letters Patent is:

1. Apparatus for testing gear wheels and worm gears in accordance with the one flank contacting or engaging method, comprising a bed, a main carriage movable on said bed, means on the carriage for rotatably mounting the gears to be tested in intermeshing relation, a rotatable cylindrical measuring disc connected with each gear to be tested, the transmission ratio of said measuring discs being identical with the gear ratio of the gears to be tested, two rulers carried by said bed and extending parallel to the direction of displacement of said main carriage, one of said rulers being stationary in longitudinal direction and the other ruler being longitudinally movable relative to said bed, said two measuring discs being each mounted in frictional engagement with one of said rulers, means for moving said main carriage whereby upon movement thereof said measuring discs roll on said rulers, and an error indicating device operatively connected with said longitudinally movable ruler to be actuated in response to longitudinal movement of the ruler owing to a supplementary movement of rotation of the measuring disc connected to said ruler caused by an error in the meshing gears being tested.

2. Apparatus for testing gear wheels and worm gears in accordance with the one flank contacting or engaging method, comprising a bed, a main carriage movable on said bed, means on the carriage for rotatably mounting the gears to be tested in intermeshing relation, a rotatable cylindrical measuring disc connected with each gear to be tested, the transmission ratio of said measuring discs being identical with the gear ratio of the gears to be tested, two rulers carried by said bed and extending parallel to the direction of displacement of said main carriage, one of said rulers being stationary in longitudinal direction and the other ruler being longitudinally movable relative to said bed, movable mounting means on said bed for moving said rulers transversely into frictional contact with the corresponding measuring discs, means for moving said main carriage whereby upon movement thereof said measuring discs roll on said rulers, and an error indicating device operatively connected with said longitudinally movable ruler to be actuated in response to longitudinal movement of the ruler owing to a supplementary movement of rotation of the measuring disc connected to said ruler caused by an error in the meshing gears being tested.

3. Apparatus as defined in claim 2, and in which said error indicating device comprises a two-armed lever having arms of unequal length, the shorter of said arms being operatively connected with said longitudinally movable ruler so that any error in the gears is transmitted with amplification by the longer arm of the lever.

4. Apparatus as defined in claim 2, and in which said longitudinally movable ruler comprises an extension, an abutment on said extension, two springs arranged on said extension on either side of said abutment, a fork cooperating with the opposed ends of said two springs and adjustably carried on the mounting means for the movable ruler to urge the ruler in one or the other direction and to cause coacting tooth flanks of the gears to be tested to resiliently abut against each other.

5. Apparatus as defined in claim 2, and in which said longitudinally movable ruler comprises an extension, an abutment on said extension, two springs arranged on said extension on either side of said abutment, a fork cooperating with the opposed ends of said two springs and adjustably carried on the mounting means for the movable ruler to urge the ruler in one or the other direction and to cause coacting tooth flanks of the gears to be tested to resiliently abut against each other, and a further carriage movably mounted on said main carriage and carrying one of the gears to be tested for adjusting it relatively to the other gear.

6. Apparatus for testing spur gear wheels in accordance with the one flank contacting or engaging method, comprising a bed, a first carriage movable on said bed, means on said carriage for rotatably mounting the gear wheels to be tested in intermeshing relation, a second carriage movably mounted on said first carriage and carrying one of said wheels for positioning the latter into correctly meshing relationship relatively to the other wheel, a cylindrical measuring disc connected with each wheel to be tested, the ratio of transmission of said discs being identical with the gear ratio of the gear wheels to be tested, two rulers carried by said bed and extending parallel to the direction of movement of said first carriage, movable mounting means on said bed for holding one of the rulers stationary and the other ruler longitudinally movable, two pairs of ruler mounting carriages transversely movable on said bed, each pair carrying one of said rulers to move each ruler into frictional engagement with one of said measuring discs, means for moving said first carriage to cause said measuring disc to roll on said rulers, said longitudinally movable ruler having an extension, an abutment on said extension, two springs arranged on said extension on either side of said abutment, a fork cooperating with the opposed ends of said two springs and adjustably carried on said mounting means for the movable ruler to urge the ruler in one or the other direction and to cause coacting tooth flanks of the two wheels to be tested to resiliently abut against each other, and an error indicating device operatively connected with said longitudinally movable ruler to be actuated in response to a longitudinal movement of the ruler caused by a supplementary movement of rotation of the measuring disc engaging said ruler owing to an error in the meshing gears being tested.

7. Apparatus for testing bevel wheels in accordance with the one flank contacting or engaging method, comprising a bed, a first carriage movable on said bed, means on said carriage for rotatably mounting the gear wheels to be tested in intermeshing relation, a second carriage and a third carriage each carrying one of the bevel wheels to be tested, said second and third carriages being mounted on said first carriage for movement and carrying each perpendicularly to the axis of the respective wheel carried thereby for positioning both wheels into correctly meshing relationship, a cylindrical measuring disc connected with each wheel to be tested, the ratio of transmission of said discs being identical with the gear ratio of the gear wheels to be tested, two rulers carried by said bed and extending parallel to the direction of movement of said first carriage, movable mounting means on said bed for holding one of the rulers stationary and the other ruler longitudinally movable, two pairs of ruler mounting carriages transversely movable on said bed, each pair carrying one of said rulers to move each ruler into frictional engagement with one of said measuring discs, means for moving said first carriage to cause said measuring disc to roll on said rulers, said longitudinally movable ruler having an extension, an abutment on said extension, two springs arranged on said extension on either side of said abutment, a fork cooperating with the opposed ends of said two springs and adjustably carried on said mounting means for the movable ruler to urge the ruler in one or the other direction and to cause coacting tooth flanks of the two wheels to be tested to resiliently abut against each other, and an error indicating device operatively connected with said longitudinally movable ruler to be actuated in response to a longitudinal movement of the ruler caused by a supplementary movement of rotation of the measuring disc engaging said ruler owing to an error in the meshing gears being tested.

KARL MÜLLER.

REFERENCES CITED

The following references are of record in the file of this patent:

UNITED STATES PATENTS

| Number | Name | Date |
|---|---|---|
| Re. 15,013 | Sauer | Dec. 21, 1920 |
| 1,444,470 | Laessker | Feb. 6, 1923 |
| 1,883,180 | Weaver | Oct. 18, 1932 |
| 1,888,298 | Teesdale | Nov. 2, 1932 |
| 2,348,712 | Dahlerup | May 16, 1944 |

FOREIGN PATENTS

| Number | Country | Date |
|---|---|---|
| 444,209 | England | Mar. 17, 1936 |